United States Patent [19]
Kennedy

[11] Patent Number: 5,718,104
[45] Date of Patent: Feb. 17, 1998

[54] CARRYING CASE FOR HAND-HELD TRANSCEIVER

[75] Inventor: Stuart B. Kennedy, Cincinnati, Ohio

[73] Assignee: Sportman's Market, Inc., Batavia, Ohio

[21] Appl. No.: 699,156

[22] Filed: Aug. 16, 1996

[51] Int. Cl.⁶ .................................................. B65B 7/20
[52] U.S. Cl. ...................... 53/491; 206/305; 206/38; 206/320; 224/236; 150/154; 150/165
[58] Field of Search .................... 206/38, 305, 320; 224/236, 237, 269, 901.2, 901.6; 150/154, 165; 53/473, 491

[56] References Cited

U.S. PATENT DOCUMENTS

| | | |
|---|---|---|
| D. 251,217 | 3/1979 | Mucha . |
| D. 346,494 | 5/1994 | Graham et al. . |
| 1,779,207 | 10/1930 | Candar . |
| 2,295,143 | 9/1942 | Watkins . |
| 4,119,249 | 10/1978 | Hanson ................................. 224/236 |
| 4,420,078 | 12/1983 | Belt et al. ............................ 224/236 |
| 4,896,805 | 1/1990 | Klaczak et al. ..................... 224/236 |
| 5,025,921 | 6/1991 | Gasparaitis et al. ............... 206/320 |
| 5,046,620 | 9/1991 | Barabino ............................. 206/38 |
| 5,121,864 | 6/1992 | Geschwind ......................... 224/236 |
| 5,234,420 | 8/1993 | Horton et al. . |
| 5,316,141 | 5/1994 | Jalomo ................................ 206/320 |

*Primary Examiner*—David T. Fidei
*Attorney, Agent, or Firm*—Wood, Herron & Evans LLP

[57] ABSTRACT

A carrying case for a hand-held transceiver having an antenna either removed or extending from a top wall thereof is provided having a pocket formed of generally flexible panels for receiving the transceiver within the pocket. A pair of independently closable flaps extend from a rear panel of the pocket in side-by-side relationship and the flaps are operable to selectively and independently fold over respective portions of the top wall of the transceiver and attach to a front panel of the pocket with the transceiver stored therein. With an antenna extending from the top wall of the transceiver, one of the flaps is folded adjacent the rear panel of the pocket to accommodate receiving the transceiver within the pocket. The other flap is operable to fold over a portion of the top wall of the transceiver adjacent the antenna to secure the transceiver within the pocket with the antenna extending therefrom. With the antenna removed, both flaps are operable to fold over and substantially completely cover the top wall of the transceiver.

9 Claims, 2 Drawing Sheets

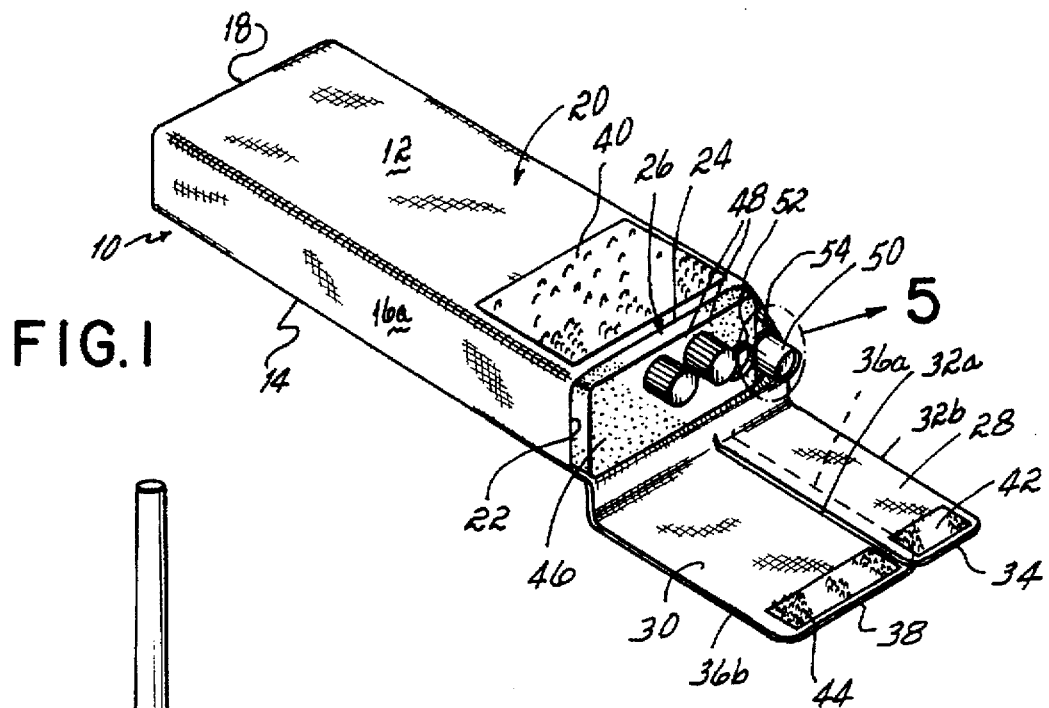
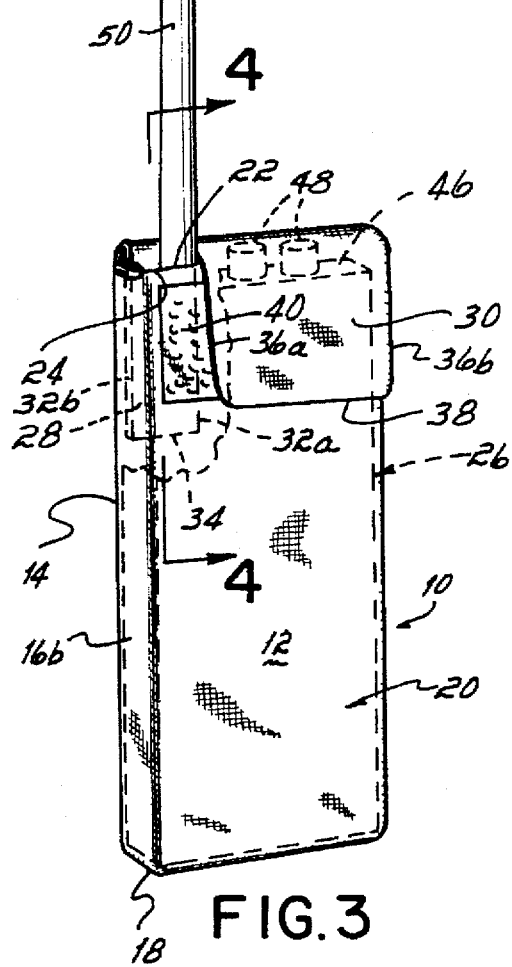
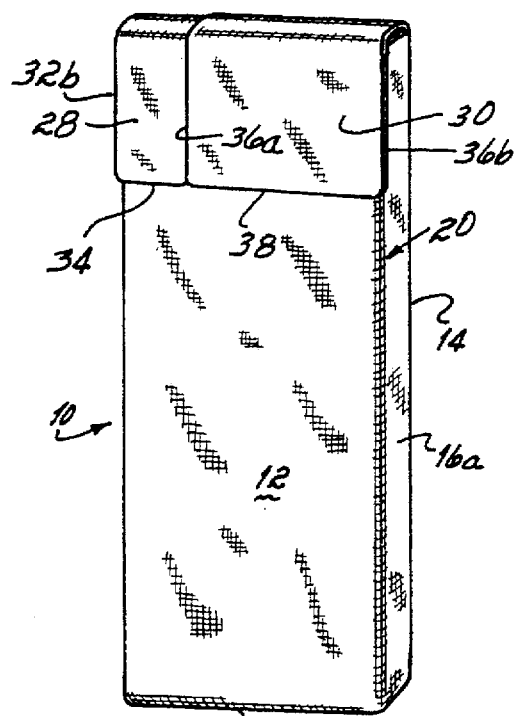

CARRYING CASE FOR HAND-HELD TRANSCEIVER

FIELD OF THE INVENTION

The present invention relates generally to carrying cases for hand-held transceivers and, more particularly, to such a carrying case for carrying hand-held radio receivers or transceivers equipped with a BNC connector or the like for selective attachment of a whip antenna.

BACKGROUND OF THE INVENTION

Hand-held radio transceivers are widely used by airplane pilots to communicate with control towers, other aircraft and, with more advanced transceiver designs, as a navigational aid during flight. These advanced transceivers generally operate in both the COMM and NAV frequency ranges of the aviation band to provide the pilot with useful communication and navigational functions throughout the entire flight.

In aviation practice, pilots typically carry the radio transceivers to monitor airport traffic, weather conditions and general airport activity, for example, before taking flight. In airplanes which are not equipped with panel mounted "nav-comm" equipment, the hand-held transceiver is typically used to provide necessary air-to-ground and air-to-air communication and also to receive radar navigation. In airplanes which include both communication and navigation radios mounted on the aircraft panel, the hand-held transceiver is typically used by the pilot as a safety backup to the on-board "nav-comm" equipment.

Hand-held transceivers are generally manufactured in a standard rectangular size to fit comfortably in one hand of an average adult and include a removable, flexible rod-like whip antenna secured to a top wall of the transceiver through an antenna BNC connector or jack. The top wall of the transceiver also generally carries volume and squelch controls, and may also carry microphone and earphone jacks and a key lock button as well.

Because the hand-held transceiver is such an important part of a pilot's flight operation, suppliers of general aviation equipment have provided various carrying cases to assist pilots in carrying the transceivers on a waist belt or through similar carrying means. Typically, the carrying case is made of flexible material such as leather or vinyl and has a pocket with an open top through which the transceiver is inserted for carrying. In one known carrying case construction, a flap is provided to extend from a rear panel of the pocket and flip over the opening to close the pocket. When the pocket is closed by the single flap, the top wall of the transceiver is covered and the radio is securely held in the carrying case by the flap. However, in order to close the flap over the opening the antenna must first be removed from the radio. If the antenna is not removed from the radio, the flap must be left open with the antenna of the radio extending from the carrying case. Thus, with this carrying case construction, the controls on the top wall of the transceiver are not protected and the transceiver is not safely secured within the pocket when the flap is left open to accommodate the antenna.

Where the flap is of solid construction, the antenna cannot be reattached to the transceiver with the flap closed so the radio is not fully operable to receive messages while stored in the carrying case. To overcome this problem, some carrying case suppliers have provided a hole in the flap to accommodate the transceiver antenna. This construction allows the antenna to be reattached to the radio after the flap is closed to allow operation of the radio, but is inconvenient because the antenna must first be removed, the single flap closed, and then the antenna reinstalled. Similarly, to remove the transceiver from the carrying case, the whole process must be reversed. Additionally, with the antenna removed from the transceiver, the hole in the single flap leaves the antenna connector susceptible to undesirable contamination or breakage.

To overcome the inconvenience of having to remove and reattach the antenna to store the transceiver in the carrying case, other suppliers have provided a single hole in the flap with a slit extending from a free end or edge of the flap to the hole. Thus, with the radio stored in the carrying case with the antenna attached, the flap may be closed over the top wall of the radio with the slit and hole accommodating the antenna. However, with the antenna detached from the radio, the slit and hole in the flap do not fully cover the controls and antenna connector of the radio and, thus, do not provide complete protection of the radio's top wall.

Another known carrying case construction simply uses a narrow flap for covering the controls of the radio but which does not cover the antenna jack area of the radio at all. While such a narrow flap avoids some of the inconvenience of a full flap, it is not as desirable in that it leaves the antenna connector area of the radio exposed when the antenna is detached from the radio.

SUMMARY OF THE INVENTION

The present invention provides a carrying case which overcomes the above disadvantages. To this end, and in accordance with the general principles of this invention, a carrying case is provided having a pocket and a pair of independently closable flaps by which to selectively cover all or selected portions of the top wall of a radio stored in the pocket. The flaps are advantageously constructed in side-by-side abutting or overlapping relationship such that one flap functions to cover all but the antenna jack area of the radio top wall, while the second flap may either be left open to expose the antenna or closed to cover the antenna jack. Where the antenna is to remain on the radio, the second flap may be folded out of the way of the antenna, such as into the pocket of the carrying case.

In this way, the dual flaps provide open and closed positions to accommodate storage of the transceiver in the pocket with or without the antenna attached to the transceiver. In the closed position, both flaps cooperate to substantially completely cover the top wall of the radio with the antenna detached. In the open position, one of the flaps is folded-away either into or outside of the pocket to accommodate the transceiver with the antenna attached, and the other flap is folded over the transceiver's top wall to cover the controls adjacent the antenna.

With this dual flap construction, the transceiver may be inserted into the carrying case without having to remove the antenna, with one of the flaps securing the radio in the case and providing desired protection for the controls on the top wall of the transceiver. With the antenna removed from the transceiver, both flaps may be folded over the radio to completely cover the top wall of the transceiver. The second flap covering the antenna-jack is preferably solid, i.e., it has no opening or hole for the antenna to project through, and thus provides complete coverage of the antenna BNC connector or jack to avoid contamination or breakage thereof.

In a preferred embodiment of the present invention, the pair of selectively and independently closable flaps partially overlap along adjoining lateral edges of the flaps to prevent objects from entering the carrying case between the flaps. In a further preferred embodiment, the flaps are asymmetrical in width relative to each other between opposing lateral edges of the flaps. In this way, one flap is sized to generally cover the antenna connector area of the radio, while the other flap is sized to generally cover the controls on the top wall of the radio adjacent the antenna connector. A fastener system may be provided on free ends of the flaps and also on a front panel of the carrying case to selectively but independently secure each flap in a closed position over the top wall of the radio.

By virtue of the foregoing, there is thus provided a carrying case for a conventional hand-held transceiver which overcomes problems typically associated with known transceiver carrying cases.

These and other objects and advantages of the present invention shall become apparent from the accompanying drawings and the detailed descriptions thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description given below, serve to explain the principles of the invention.

FIG. 1 is a perspective view of a carrying case for a hand-held transceiver incorporating the features of this invention;

FIG. 2 is a perspective view of the carrying case of FIG. 1 showing the hand-held transceiver received in the carrying case without an antenna extending therefrom;

FIG. 3 is a view similar to FIG. 2 showing the hand-held transceiver received in the carrying case with an antenna extending therefrom;

DETAILED DESCRIPTION OF THE INVENTION

Figure 4:
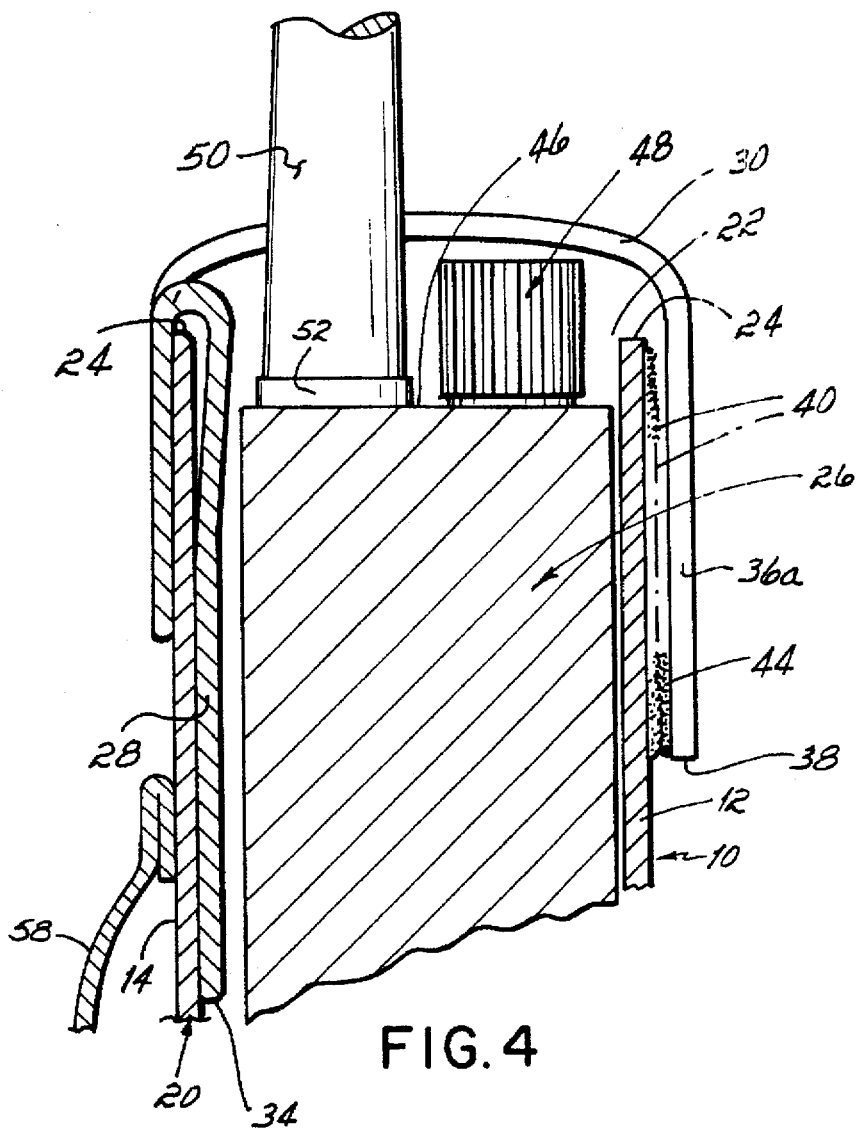
FIG. 4 is an enlarged partial cross-sectional view taken along line 4—4 in FIG. 3.

With reference to FIG. 1, there is shown a hand-held transceiver carrying case 10 incorporating the features of the present invention. The carrying case 10 is generally rectangular in cross-section and is preferably made of a durable flexible meshed fabric. Case 10 includes a front panel 12, a rear panel 14, side panels 16 a and 16 b and a bottom panel 18 joined at their marginal edges by sewn seams to form a generally rectangular pocket 20 having an opening 22 at the top of the pocket.

The opening 22 is defined by peripheral edge 24 of the front panel 12, rear panel 14 and side panels 16a and 16b. Case 10 is constructed such that pocket 20 substantially envelops a hand-held transceiver 26 which is inserted through the opening 22 during use of the carrying case 10 as will be described in more detail below. Typically, the transceiver 26 is sized to fit comfortably in one hand of an average adult and is therefore manufactured to a generally standard rectangular size. In accordance with this generally standard transceiver size, case 10 (and the pocket 20) is about 7-¾ inches in height (from bottom panel 18 to peripheral edge 24), about 3 inches in width (from side panel 16 a to side panel 16 b ) and about 1-½ inches in depth (from front panel 12 to rear panel 14), although other dimensions may be considered.

In accordance with the present invention, a pair of independently closable, rectangular flaps 28 and 30 are provided by which to selectively close opening 22 of case 10 with transceiver 26 contained in pocket 20. To this end, in one embodiment flaps 28 and 30 are attached to an outer surface of rear panel 14 proximate the peripheral edge 24 by a single row of stitching. The flaps 28 ant 30 extend from the rear panel 14 in side-by-side, abutting relationship and are adapted to fold over the opening 22 and to secure to the front panel 12 as will be described in more detail below. Flap 28 includes lateral edges 32a and 32b which extend from the rear panel 14 to a transverse free edge or end 34. Likewise, flap 30 includes lateral edges 36a and 36b which extend from the rear panel 14 to a transverse free edge or end 38. By way of example, the independently closable flaps 28 and 30 may be about 2-⅞ inches in length (from the peripheral edge 24 to the transverse free ends 34 and 38, respectively). In a preferred embodiment of the present invention, the adjoining lateral edges 32a and 36a of flaps 28 and 30, respectively, not only abut but also overlap about ¾ of an inch to prevent objects from entering the pocket 20 between the lateral edges of the flaps when the flaps are in a closed position.

In construction, the side panels 16 a and 16 b and the bottom panel 18 may be a unitary piece of flexible fabric which is joined along its marginal edges with the front and rear panels 12 and 14, respectively. Alternatively, the side panels 16 a and 16 b, and bottom panel 18, may be separate pieces of fabric which are joined with the front and rear panels 12 and 14 along their marginal edges. In this way, pocket 20 may be assembled by providing a single row of stitching along seams joining the front panel 12 to the side panels 16 a and 16 b and the bottom panel 18. In a similar fashion, the rear panel 14 may be joined to the side panels 16 a and 16 b and the bottom panel 18 by another single row of stitching along seams joining the panels.

More particularly, in one preferred embodiment, each of the front panel 12, rear panel 14, side panels 16, and 16 b, and bottom panel 18 include inwardly folded marginal edges (i.e., into pocket 20) which are joined by a single row of stitching to form seams of about ½ inch in depth. To prevent fraying of the marginal edges of the flexible fabric at the seams, a strip of nylon or similar material about ⅞ inch in width is first folded along the length of the strip over the inwardly folded marginal edges of the panels 12, 14, 16 a, 16 b, and 18, and then the single row of stitching is applied to enclose the strips over the marginal edges of the panels. Likewise, additional strips of nylon or similar material may be applied by a single row of stitching about peripheral edge 24, edges 32a, 32b and 34 of flap 28, and edges 36a, 36b and 38 of flap 30, to further prevent fraying of the edges and to add a decorative appearance to carrying case 10.

In one preferred embodiment, the flaps 28 and 30 are joined to an outer surface of the rear panel 14 proximate the peripheral edge 24 by a single row of stitching, although it will be appreciated that the flaps 28 and 30 could be integral fabric extensions of the rear panel 14 without departing from the spirit or scope of the present invention. It will also be understood that the fabric used for the front panel 12, rear panel 14, side panels 16 a and 16 b, bottom panel 18, and flaps 28 and 30 may be virtually any durable, flexible fabric (e.g., leather), although a fabric made from DuPont's Cordura® Plus Nylon is preferred.

Flaps 28 and 30 are advantageously solid (i.e., there are no holes or apertures therethrough for objects to project through). Additionally, carrying case 10 may be provided with a fastener system by which to selectively and independently close each of the flaps 28 and 30 over the opening 22. To this end, a hook and loop fastener system such as Velcro® may be utilized such that a panel 40 of loop material is secured against the outer surface of front panel 12 and a pair of hook panels 42 and 44 is attached to an inner surface of each flap 28 and 30, respectively, proximate respective transverse free ends 34 and 38. In this way, hook fastener panels 42 and 44 of flaps 28 and 30 cooperate with loop fastener panel 40 on panel 12 to secure the flaps in a closed position over pocket 20.

As shown most clearly in FIGS. 1 and 4, the transceiver 26 includes a top wall 46 which carries various controls 48 such as volume and squelch controls, for example, and a selectably removable rod-like whip antenna 50. The top wall 46 of transceiver 26 further includes an antenna BNC connector or jack 52 which projects from the top wall and provides the necessary connection between the antenna 50 and internal circuitry (not shown) of the transceiver. Flaps 28 and 30 are preferably asymmetrical in width relative to each other between respective lateral edges 32a, 32b and 36a, 36b. By way of example, the flap 28 may be about 1¼ inches in width (between lateral edges 32a and 32b) and flap 30 may be about 2½ inches in width (between lateral edges 36a and 36b). In this way, flap 28 is sized to generally cover the antenna connector 52 on the top wall 46 of transceiver 26, while flap 30 is sized generally to cover the controls 48 on the top wall of the transceiver adjacent the antenna connector.

Figure 5:
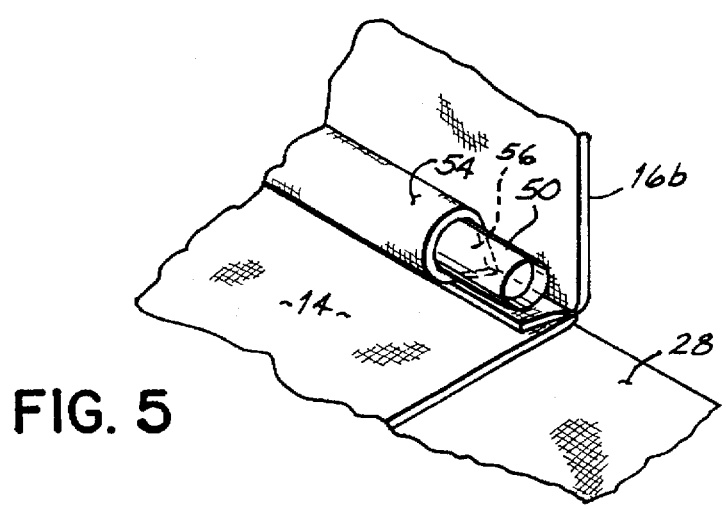
FIG. 5 is an enlarged cut-away view from FIG. 1 showing an antenna storage sleeve within the carrying case.

As shown most clearly in FIG. 5, an elongated sleeve 54 of fabric may be secured within pocket 20 along the seam joining rear panel 14 and side panel 16 b, for example, to provide a pocket 56 for selectively storing antenna 50 within the case when the antenna is removed from the transceiver 26. In one preferred embodiment, sleeve 54 is made from a strip of flexible meshed fabric folded lengthwise along its centerline to form the pocket 56, and extends from about ½" from the bottom panel 18 to about ½" below the peripheral edge 24.

In use of the carrying case 10, and in accordance with the method of the present invention, the transceiver 26 is inserted into pocket 20 through opening 22 with or without the antenna 50 extending from the top wall 46 of the transceiver. In this way, pocket 20 substantially envelops transceiver 26 for protection and carrying of the transceiver. With the antenna 50 coupled to the BNC connector or jack 52, as shown in FIGS. 3 and 4, the flap 28 may be folded to a folded-away position, such as adjacent the rear panel 14, to accommodate receiving the transceiver 26 through opening 22 and into pocket 20. In one preferred embodiment, the flap 28 is inserted into pocket 20 before inserting the transceiver 26 through opening 22. It will be appreciated by those skilled in the art, however, that flap 28 is equally adapted to be folded down outside of pocket 20 to accommodate transceiver 26. Alternatively, flap 28 may be slidably received in a pocket (not shown) formed on the rear panel 14, for example, such that the flap may be slidably pulled out from the pocket to cover a portion of the top wall 46 of the transceiver 26 during use, and then slidably received back in the pocket when use of the flap is not required.

With the transceiver 26 inserted into pocket 20 with the flap 28 folded away, and with the antenna 50 extending from top wall 46 of the transceiver, flap 30 is closed over opening 22 and over a portion of the top wall 46 adjacent the antenna. Flap 30 is secured to the front panel 12, as shown most clearly in FIGS. 3 and 4, by the fastener system including hook and loop panels 44 and 40, respectively. In this way, the folded-away flap 28 accommodates the antenna 50 extending from the top wall 46 of the transceiver 26, while the flap 30 safely covers the controls 48 of the radio and secures the transceiver within the pocket 20.

When the antenna 50 is removed from the transceiver 26 (and stored in the elongated sleeve 54 as shown in FIG. 5 if desired) flap 28 is also closed over the opening 22 to substantially completely cover the antenna jack area 52 on the top wall 46 of the transceiver, as shown most clearly in FIG. 2. Flap 28 is secured to the front panel 12 by the fastener system including loop and loop portions 42 and 40, respectively. Because flap 28 is solid, antenna connector 52 is protected when the antenna 50 is removed from the transceiver 26. Flap 30 is closed over the rest of pocket 20 such that flaps 28 and 30 cooperate to overlie substantially completely the pocket opening 22 and the top wall 46 of the transceiver 26. Moreover, because lateral edges 32a and 36a of the flaps 28 and 30 advantageously overlap, additional protection is provided to the top wall 46 of the transceiver 26.

As shown in FIG. 4, carrying case 10 may include one or more loops of fabric 58 (one shown) secured to an outer surface of the rear panel 14 which are adapted to receive a belt encircling the waist of a wearer. It is also contemplated that conventional clips (not shown) may be provided on the carrying case 10 to secure the case to apparel of the wearer without departing from the scope or spirit of the present invention.

Thus, it will be appreciated that the present invention provides a carrying case for a hand-held transceiver having an antenna BNC connector or the like to accommodate a whip-like antenna extending from the radio. In a partially open configuration, flap 30 is closed over the transceiver 26 stored in pocket 20 and flap 28 is left open, thereby allowing antenna 50 to be connected to jack 52 without requiring the transceiver controls 48 to be left unprotected or the antenna to be first removed from the transceiver. Flap 30 thus completely covers the controls 48 on the top wall 46 of the transceiver 26, and further secures the transceiver in the pocket 20 for carrying thereof. In a fully closed configuration, i.e., with both flaps 28 and 30 closed and the antenna removed from the transceiver, the antenna jack area is completely protected by the flap 28 and the controls 48 are protected by flap 30.

While the present invention has been illustrated by description of a preferred embodiment thereof, and while that embodiment has been described in considerable detail, it is not the intention of Applicant to restrict or in any way limit the scope of the appended claims to such details. Additional advantages and modifications will readily appear to those skilled in the art. For example, flap 30 may be provided with one or more apertures to accommodate for microphone or earphone jacks to plug into transceiver 26 while it is stored in pocket 20. It will also be appreciated that the fastener system comprising loop panel 40 and hook portions 42 and 44 may be replaced with cooperating snaps c the like. Thus, the invention in its broader aspects is not limited to the specific details, representative apparatus and method and illustrative examples shown and described. Accordingly, departure may be made from such details without departing from the spirit or scope of Applicant's invention.

Having described the invention, what is claimed is:

1. A method of carrying a hand-held transceiver having a connector on a top wall thereof for selectively attaching a rod-like antenna thereto, comprising the steps of:

defining a generally rectangular pocket by a plurality of generally flexible panels, the pocket having an opening at one end for receiving said transceiver therethrough and into the pocket;

providing first and second generally rectangular, flexible, independently closable flaps associated with the pocket, each of the flaps having a closed position overlying a respective portion of the opening;

folding one of the flaps to a folded-away position;

inserting said transceiver into the pocket through the opening with the antenna extending therefrom; and folding the other flap over a portion of the top wall adjacent the antenna to secure said transceiver in the pocket with the antenna extending therefrom.

2. The method of claim 1 further comprising the step of providing an elongated sleeve within the pocket for storing the antenna within the sleeve.

3. The method of claim 1 further comprising the step of securing the other flap to one of the panels in the closed position.

4. The method of claim 1 wherein the first and second flaps are arranged in a side-by-side abutting relationship in the closed position of both flaps.

5. The method of claim 1 wherein the first and second flaps partially overlap in the closed position of both flaps.

6. The method of claim 1 wherein the first and second flaps are asymmetrical in width relative to each other.

7. The method of claim 1 wherein the folded-away position is within the pocket.

8. The method of claim 1 wherein the folded-away position is exterior of the pocket.

9. The method of claim 1 further including fasteners associated with the first and second flaps and at least one of the panels, the fasteners cooperating to selectively and independently secure the first and second flaps in the closed position.

* * * * *

UNITED STATES PATENT AND TRADEMARK OFFICE
CERTIFICATE OF CORRECTION

PATENT NO. : 5,718,104

DATED : February 17, 1998

INVENTOR(S) : Stuart B. Kennedy

It is certified that error appears in the above-identified patent and that said Letters Patent is hereby corrected as shown below:

Column 3, line 50, please join text with previous line.

Column 4, line 7, please delete "flaps 28 ant 30" and replace with -- flaps 28 and 30 --.

Column 4, line 10, please join text with previous line.

Column 4, line 36, please join text with previous line.

Column 5, line 51, please join text with previous line.

Column 6, line 58, please delete "c the like" and replace with -- or the like--.

Column 8, line 5, please delete "method of claim 1" and replace with -- method of claim 4--.

Signed and Sealed this

Thirtieth Day of June, 1998

*Attest:*

*Attesting Officer*

BRUCE LEHMAN

*Commissioner of Patents and Trademarks*